United States Patent [19]

Collins

[11] 4,231,780
[45] Nov. 4, 1980

[54] TREATMENT OF PHOSPHATE ROCK ON SOIL IN SITU WITH SULFURIC ACID

[75] Inventor: Dwight D. Collins, Bakersfield, Calif.

[73] Assignee: Chemsoil Corporation, Bakersfield, Calif.

[21] Appl. No.: 720,499

[22] Filed: Sep. 3, 1976

[51] Int. Cl.² ............................................. C05B 1/00
[52] U.S. Cl. ................................... 71/40; 71/64 SC
[58] Field of Search ................. 71/37, 40, 43, 64 C, 71/64 SC

[56] References Cited

U.S. PATENT DOCUMENTS

| | | | |
|---|---|---|---|
| 49,831 | 9/1865 | Liebig | 71/37 |
| 1,048,454 | 12/1912 | Bash | 71/40 |
| 1,413,048 | 4/1922 | Matheson | 71/40 |
| 1,849,988 | 3/1932 | Moore | 71/37 |
| 1,869,941 | 8/1932 | Oben | 71/37 |
| 2,504,546 | 4/1950 | Wight | 71/40 |
| 2,680,679 | 6/1954 | Harvey | 71/37 |
| 3,030,200 | 4/1962 | Harris | 71/37 |
| 3,170,784 | 2/1965 | Hand | 71/40 |
| 3,177,062 | 4/1965 | Hignett | 71/64 DA |
| 3,979,199 | 9/1976 | Collins et al. | 71/40 |

FOREIGN PATENT DOCUMENTS

| | | | |
|---|---|---|---|
| 18391 | 7/1934 | Australia | 71/46 |
| 469098 | 10/1950 | Canada | 71/40 |
| 320 | of 1865 | United Kingdom | 71/40 |

OTHER PUBLICATIONS

Agricultural Chemicals, vol. 11, No. 2, pp. 38–40, 125–127, Feb. 1956, Sulfur–Sulfuric Acid.

Primary Examiner—Ernest G. Therkorn
Attorney, Agent, or Firm—Donald D. Mon

[57] ABSTRACT

A layer of bare, untreated phosphate rock granules is applied to the soil, and concentrated sulfuric acid is supplied thereto. The sulfuric acid is sufficiently concentrated so as to be containable by cold-rolled carbon steel, and sufficiently viscous to cling to the granules to react therewith. Sulfuric acid in excess of the amount needed for reaction with the phosphate rock can be added to correct alkaline conditions in the underlying soil. The reaction of sulfuric acid with the phosphate rock produces substantial quantities of available phosphate and gypsum.

14 Claims, No Drawings

TREATMENT OF PHOSPHATE ROCK ON SOIL IN SITU WITH SULFURIC ACID

This invention relates to fertilizing of croplands, and in particular to a process which enables pulverized phosphate rock to be applied directly to the soil to be fertilized, with the subsequent release of phosphorus in an amount significantly in excess of that which would be secured from solubilization by untreated irrigation water. The process of this invention simultaneously creates gypsum in the soil, can assist in the correction of alkaline soils and can assist in the uptake of useful trace elements.

In United States patent application Ser. No. 557,017, entitled "Treatment of Phosphate Rock in Soil to Provide Fertilizer and Gypsum" filed by Dwight D. Collins et al on Mar. 10, 1975, now U.S. Pat. No. 3,979,199, which is assigned to the same assignee as the instant invention, there is shown the process of applying bare untreated finely ground phosphate rock to the surface of cropland, and thereafter applying to it water containing sulfurous acid, thereby to create "available phosphate" and gypsum. It is an object of this invention significantly to advance the attainment of this objective, and to attain additional objectives as well, by applying concentrated sulfuric acid instead of sulfurous acid in accordance with the techniques described below.

The use of phosphate fertilizer is widespread. The most common source of phosphate fertilizer is phosphate rock, which contains various phosphorus compounds, some of which are readily solubilized in neutral or nearly neutral aqueous solutions, such as some irrigation waters. These phosphorus compounds provide phosphorus values useful to plants, and these phosphorus values are commonly called "available phosphate". Available phosphates represent only a fraction of the total phosphorus compounds in phosphate rock, but the remaining portion is not practically solubilized by common irrigation waters, and if it does become "available phosphate" at all, it is over a long period of time measured in years. Basically, all phosphorus compounds represent potentially useful fertilizers, and to the extent they are not brought into aqueous solution, they represent a substantial economic loss, and the waste of a natural resource.

Phosphate rock, when very finely pulverized, has historically had important but limited use as a fertilizer by itself, especially in regions where the rain tends to be acidic. The limitations upon the direct usage of phosphate rock are chiefly the consequence of the small portion of the available phosphate they inherently contain, and the slow rate at which even that portion is solubilized. Consequently, the preponderant modern usage of phosphate rock for fertilizer is as a raw material for the manufacture of phosphoric acid and for superphosphate. Superphosphate is phosphate rock treated by various processes, primarily involving sulfuric acid, for the purpose of increasing the percentage of available phosphate. To make superphosphate, it is an economic necessity to provide a sulfuric acid plant near the place of treating the rock, and this is a costly installation. Furthermore, the manufacture and application of the superphosphate involve expenses and complications of their own. One disadvantage of using superphosphate as a fertilizer is that, as the available phosphorus is solubilized in the soil from it, the residual calcium product (calcium forming a substantial portion of the phosphate rock) is likely to be other than the sulfate. This residual component will later require corrective treatment of the soil such as by the addition of gypsum. In fact, the treatment of commercial croplands with gypsum is a very common operation.

It is an object of this invention to enable raw phosphate rock to be applied directly to the cropland, there to be treated with sulfuric acid so as in a relatively short period of time to solubilize a greater proportion of the phosphorus values in the rock than is possible by direct water leaching of the rock with irrigation water or by the slow dissolution of the rock caused by plant juices. As a matter of fact, substantially all of the phosphorus value can be solubilized in the process of this invention, and in addition a substantially greater residue of the treated rock will be calcium sulfate (gypsum). This will greatly reduce, and in some cases even eliminate, the requirement for a supplementary application of gypsum.

It is another object of this invention to provide a method wherein the reaction between the sulfuric acid and the phosphate rock takes place in such a manner as to minimize the reaction of iron or aluminum with the phosphate. Iron and aluminum form phosphates which remain insoluble at pH levels at which croplands are maintained, and thereby lock up the phosphate with which they react.

It is still another object of this invention to provide a method wherein a desired ratio between monohydrogen phosphate and dihydrogen phosphate can be produced so as to benefit specifically a type of crop to be grown.

It is yet another object of this invention to provide a method whereby the reactions take place in such a manner as to produce the desired available phosphate with a minimum of hydroxyl ion. Hydroxyl ions compete with the phosphate for uptake by the plant of the same root sites. This tendency explains the poor growth which occurs in alkaline soil.

It is still a further object of this invention to correct alkalinity of soil beneath a layer of phosphate rock, providing the sulfuric acid in a concentration where it is sufficiently viscous to remain in a layer where it completes a localized reaction, without excessive migration between reacting layers. In this manner, the respective desired reactions are likelier to go to completion.

The method according to this invention is to apply to a soil surface a layer of pulverized raw untreated granules of pulverized phosphate rock containing phosphorus and calcium which has not been previously treated by sulfuric acid without mixing the granules into the soil or otherwise covering the granules, and then applying to the top of said layer, sulfuric acid of such concentration as to be containable by equipment made of cold-rolled carbon steel without substantial corrosion thereof, which is more viscous than water, and which is deliquescent or hygroscopic. Sulfuric acid of this concentration tends to remain adherently in contact with the phosphate rock granules.

When corrective treatment of the soil beneath the layer is not required, the amount of acid is limited to that which will react with the layer, and remain with it.

When corrective treatment is desired, the amount of sulfuric acid applied is sufficient to treat both the layer of phosphate rock and the soil beneath it to the desired depth.

According to a preferred but optional feature of the invention, after the reaction between the granules and the sulfuric acid is substantially completed, water is applied to the exposed surface in quantity to adjust the pH in the region of the products of reaction in the layer to a level which supplies monohydrogen phosphate and dihydrogen phosphate ion in a ratio best suited for the plant contemplated to be grown in the soil.

The above and other features of this invention will be fully understood from the following detailed description.

In considering this invention, there are a number of facts and conditions which, if kept in mind, will greatly assist the reader in understanding the invention. These are as follows:

1. Western phosphate rock is basically calcium fluorapitite $Ca_{10}(PO_4)_6F_2$. There will usually be some carbonates intermeshed in the basic structure as an impurity. In addition other trace elements are found there which usually include some or all of the following: vanadium, cobalt, chromium, nickel, molybdenum, uranium, zinc, silver, arsnic, cadmium, copper and beryllium.

2. The chemistry of the phosphate/sulfuric acid process can be summed up by the following reaction:

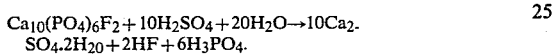
$$Ca_{10}(PO_4)_6F_2 + 10H_2SO_4 + 20H_2O \rightarrow 10Ca_2SO_4.2H_2O + 2HF + 6H_3PO_4.$$

From this it can be seen that if the reaction is to proceed, it will do so because it forms a stable compound of calcium sulfate. The most predominate form of calcium is hydrated gypsum, which requires water of hydration as shown above. Without water for the hydration, the reaction will not stably proceed to produce gypsum and phosphoric acid.

3. Sulfuric acid is strongly deliquescent (this term is used interchangeably with "hygroscopic" herein) and chemically able to remove water not only from the atmosphere and from available water, but also from chemicals such as cellulous, starch or sugar. In these latter chemicals, it leaves after it removes the water, only a black charred material which in essence is carbon. Thus it can be seen the concentrated sulfuric acid as contemplated herein can draw water from its surroundings to complete the formula described in item 2, above.

4. Plants absorb phosphorus in two primary forms: monohydrogen phosphate, $(HPO_4)^{-2}$, and dihydrogen phosphate $(H_2PO_4)^{-1}$.

5. Different plants require different amounts of each of the two acid phosphates. However, each quota must be filled by the plant separately. This is to say that there can be no substitution with monohydrogen phosphate when dihydrogen phosphate is required by the plant and vice versa. Accordingly, for successful plant growth a proper ratio between them must be secured, and this is a function of pH.

6. In the acid region numerically below $pH_7$, dihydrogen phosphate predominates. In the basic region numerically above $pH_7$, monohydrogen phosphate predominates.

7. Hydroxyl ions vigorously compete for the same root cell sites as the phosphate ions. At high pH levels (more basic conditions) these attacks by the hydroxyl ion limit the plant's uptake of phosphate because the hydroxyl ions occupy the sites and prevent the assumption of phosphate.

8. The pH-limiting phosphate chemistry herein can be summed up by the following table:
    pH in the range between about 3 and about 4: iron and aluminum are soluble in soil, and form insoluble phosphates, and thus keep the phosphates permanently tied up in a form useless to the plant.
    pH in the range between about 5 and about 6: the iron is still soluble and iron does form a nearly insoluble phosphate in this range.
    pH in the range between about 6 and about 7.5: the calcium as monohydrogen phosphate predominates and is fairly soluble.
    pH above 7.5: there are two forms of phosphate, $Ca_3(PO_4)_2$ and $Na_2H(PO_4)_3$, which are completely soluble; however, there is the onset of competing $OH^-$ ions which the higher the pH, the more restrictive is the uptake of phosphate.

9. In the root zone, the pH generally is lower (more acidic) than in the soil as a whole, because carbon dioxide is given off by the plant at the root sites.

10. Phosphate and phosphate rock are essentially unavailable at pH's numerically above about 6.5. This is to say that the rock will still hold the phosphate in more basic conditions. Based upon the observation of the behavior of phosphate rock which is spread directly on fields in Illinois and Missouri, ground to 100 mesh size, it is known that the rock can under proper circumstances, be used directly. This is because rain in these parts of the country is acidic, and the soil forms an acidic site. However, the rate of release of available phosphate is lower.

Because iron and aluminum in the soil become soluble at pH 3 to 4, it is desirable to apply the sulfuric acid in such a way that the dissolved iron and aluminum do not react with the phosphate to form insoluble compounds, or at least to do so in such a way as to minimize the event. As will later become apparent, the appropriate selection of viscosity causes the sulfuric acid which is to react with the phosphate rock to cling to and remain with the rock, and the excess passes to the soil beneath it, where it penetrates and clings to the soil. Migration is minimized between the phosphate rock layer and the soil—the acid does not puddle appreciably. Therefore the reactions in the phosphate rock and in the soil both occur to their own best advantage, and with at least minimized inter-reaction.

When the soil treatment is not desired, and primarily only treatment of the phosphate rock is sought, it is best practice to conduct the reaction between the sulfuric acid and the phosphate rock such that when the materials finally reach the soil itself, the pH is not less than about 6 and not greater than about 7.5–8.0. This avoids the forming of iron or aluminum phosphates on the one hand, or excessive hydroxyl ions on the other hand. In accordance with this invention, the reaction between the sulfuric acid and the rock can take place at very low pH and at maximum rates and productive efficiency. However, under these circumstances, the process should be carried out in such a way that the acid itself does not reach the soil in appreciable quantities. The reaction occurs largely at and within the phosphate rock itself. After the reaction is completed, the pH can be adjusted by dilution, and the product can readily be mixed into the soil where it acts the same as though superphosphate and gypsum had initially been added.

When soil correction is sought, then a greater amount of acid is added, but because of the viscosities involved, the products of reaction in the phosphate rock layer will essentially remain in place. Then the iron and aluminum will appear as soluble sulfates. The pH of the layers will preferably be increased by dilution with water before the phosphate rock and soil are mixed, in order to minimize the formation of insoluble iron and aluminum phosphates at low pH values.

From the foregoing it will be seen that a feature of the invention is that the reaction between the phosphate rock and the sulfuric acid occur in a layer that consists essentially of these two compositions and does not interact with the soil while the pH is low, thereby avoiding the formation of iron and aluminum phosphates which tend to remain insoluble quite permanently.

Accordingly this invention is carried out by applying to the surface of cropland a layer, as continuous as practicable, of granules of bare, raw, untreated pulverized phosphate rock which has not been previously treated by sulfuric acid, and without mixing the granules into the soil or otherwise covering them. This forms a surface layer covering the soil which layer is substantially reactive to sulfuric acid. Thereafter, sulfuric acid is applied to the top of this layer. It is applied in such concentrations as to be containable by equipment made of cold-rolled carbon steel without substantial corrosion, more viscous than water, and deliquescent. It is very desirable that this sulfuric acid be containable by conventional inexpensive means. To be able to use cold-rolled carbon steel is a large advantage in that it avoids the additional expense of stainless steel and maintenance of critical parts. It is well known that sulfuric acid in concentrations at and above about 75% can readily be handled in cold-rolled carbon steel. When it is much more dilute, it rapidly attacks the containers. Furthermore at and above approximately 75%, sulfuric acid is deliquescent, and tends to acquire water from the air or from whatever source is available to it. Also, at concentrations at and above about 75%, the sulfuric acid is quite viscous and tends to cling to materials which it contacts.

For example, 98% sulfuric at 68° F. has a viscosity of approximately 25 centipoises. At 77.7% its viscosity is about 17 centipoises, both more viscous than water, and both useful in this process. These are examples of two suitable sulfuric acid concentrations. Concentrations above about 75%, to the top of the percentage range which can be contained in cold-rolled carbon steel, are contemplated to be used.

By utilizing sulfuric acid in this range, it may be handled by conventional spray booms and agricultural equipment, is viscous so that it tends to cling to the rock where it completes its reaction, and either contains, or is able to attract the water required for the reaction to go to completion from its surrounding without requiring the addition of irrigation water, or of reacting with some of the iron or aluminum therein. Of course, water can be added, if desired.

When only reaction with the phosphate rock is desired, the acid will be applied in an appropriate amount, which usually will just thoroughly wet the phosphate rock layer. It is well to distribute the acid in drop rather than stream forms for this purpose.

When acid treatment of the soil beneath the phosphate rock layer is to be accomplished, then the sulfuric acid stream may be heavier, and tend to drench it, because acid excess to the amount that clings to the phosphate rock will rather quickly pass into the soil. It will carry some of the phosphate with it, but such migration (or transfer) will effectively cease when the excess acid has drained past the phosphate rock layer.

When only the reaction with the phosphate rock is desired and the acid was largely confined to that layer, the layer will, of course, be strongly acidic, and it is undesirable to mix it directly into the soil in this condition although it is permissible to do so. Instead, it is best practice to dilute the product by irrigation or spraying or otherwise so that it reaches a pH that provides the desired ratio between the mono and dihydrogen phosphates suitable for the crop to be grown.

When subsurface soil correction is performed, then the lowering of the acidity by dilution is also to be preferred before the soil is turned over, because this will also tend to minimize the formation of insoluble iron and aluminum phosphates.

It will be evident from the foregoing that it is best practice to apply both the pulverized rock and the sulfuric acid in relatively finely divided form. The rock should be ground to a size all of which will pass 100 mesh or smaller. The preferred acid concentration is about 95%, and the preferred granule size is about 200 mesh. An application of about 400 lbs. of rock per acre gives a good coverage, and about one ton per acre of 98% sulfuric acid appears to be suitable amounts to provide about 120 units of $P_2O_3$ per Acre 6", and to correct a mildly alkaline soil. Such rock may be about 47% calcium, and the gypsum produced by the reaction is also a soil corrective.

The foregoing illustrates a considerable advantage with using sulfuric acid over the use of sulfurous acid, because sulfurous acid is a relatively dilute solution and requires so much water that so much of the sulfurous acid might flow past the phosphate rock and enter the soil directly that there would be an insufficient reaction with the rock. It is an advantage of the selection of sulfuric acid and of its concentration in this invention that sulfuric acid will remain with the rock until considerable reaction has occurred.

This invention thereby provides a method and means for applying phosphate rock to the soil and converting it in situ to available phosphate, after which, if desired, the pH may be adjusted so as to provide optimum conditions for the production of the desired ratio of monoacid or diacid phosphate, after which the soil may be turned to mix the products of reaction into the soil.

While the term "layer" has been used for the phosphate rock application, it will be understood that it is not a layer in the sense of a "sheet". Instead, the granules are distributed as evenly as possible over the surface, and if sufficient material is provided it will in fact completely cover the soil. However, this invention also comprehends the application of rock in such sizes and amounts that soil is visible between the rock particles. What is important in this invention is that the phosphate rock is divided so as to have a substantial exposed surface area where the viscous sulfuric acid clings and reacts.

Also, this treatment dissolves many trace elements, such as magnesium and zinc, further to improve the soil.

This invention is not to be limited by the embodiments described in the description but only in accordance with the scope of the appended claims.

I claim:

1. The method of providing available phosphate and gypsum to soil comprising:

(a) applying bare granules of pulverized phosphate rock which has not been previously treated by sulfuric acid to the top of the soil exposed to the air without mixing the granules into the soil or otherwise covering the granules, whereby to form a layer of granules the top of which is exposed to the air and whose area covers the top of the soil to an appreciable extent; and (b) applying to the top of said layer, sulfuric acid of such concentration as to be containable by equipment made of cold-rolled carbon steel without substantial corrosion, more viscous than water, and deliquescent, said concentration being above about 75% $H_2SO_4$, whereby that portion of the sulfuric acid which contacts the granules tends to remain adherently in contact with the granules and attract water for reaction with said granules, without substantial penetration of the acid into the soil beneath the granules.

2. The method of claim 1 in which the concentration of sulfuric acid is between about 80% and about 100%.

3. The method of claim 1 in which the concentration of sulfuric acid is about 83%.

4. The method of claim 1 in which the size of the granules is about 200 mesh.

5. The method of claim 1 in which sulfuric acid is applied to the said layer in amounts in excess of that which will adhere to the granules, and sufficient to treat at least the surface of the soil with said acid.

6. The method of claim 5 in which about 400 lbs/Acre of granules, and sulfuric acid in amount to apply sulfate equivalent to about one ton of 98% sulfuric acid are applied to the soil.

7. The method of claim 1 including the following additional step:

(c) after the reaction between the granules and the sulfuric acid is substantially completed, applying water to the top of said layer of granules in quantity to adjust the pH in the region of the products of said reaction to a level which supplies $(HPO_4)^{-2}$ and $(H_2PO_4)^{-1}$ in a ratio suited for the plants contemplated to be grown in the soil.

8. The method of claim 1 including the following later step:

(d) mixing the products of reaction into the soil beneath them.

9. The method of claim 8 in which the concentration of sulfuric acid is between about 80% and about 100%.

10. The method of claim 8 in which sulfuric acid is applied to the said layer in amounts in excess of that which will adhere to the granules, and sufficient to treat at least the surface of the soil with said acid.

11. The method of claim 7 in which the concentration of sulfuric acid is between about 80% and about 100%.

12. The method of claim 7 in which sulfuric acid is applied to the said layer in amounts in excess of that which will adhere to the granules, and sufficient to treat at least the surface of the soil with said acid.

13. The method of claim 12 in which the concentration of sulfuric acid is between about 80% and about 100%.

14. The method of claim 13 in which the concentration of sulfuric acid is between about 80% and about 100%.

* * * * *